United States Patent [19]
Christiansen et al.

[11] 3,755,226
[45] Aug. 28, 1973

[54] EPOXY BITUMEN SYSTEM FOR ROAD SURFACING

[76] Inventors: Paal Christiansen, Nidelbadstrasse 25, Ruschlikon, Zurich; Johan Spoelder, Seegutstrasse 17, Au, Zurich, Horgen, both of Switzerland

[22] Filed: Nov. 24, 1971

[21] Appl. No.: 201,967

[30] Foreign Application Priority Data

Dec. 10, 1970  Great Britain ............... 58657/70

[52] U.S. Cl. ....... 260/28, 260/30.4 EP, 260/30.4 N, 260/31.2 R, 260/33.6 EP, 260/33.6 N, 260/37 N, 260/37 EP
[51] Int. Cl. ........................................... C08g 51/52
[58] Field of Search .................. 260/28, 830 P, 33.6

[56] References Cited
UNITED STATES PATENTS

| | | | |
|---|---|---|---|
| 3,179,610 | 4/1965 | Wood | 260/28 |
| 3,238,165 | 3/1966 | Simpson et al. | 260/28 |
| 3,525,779 | 8/1970 | Hawkins | 2A60/37 N |

*Primary Examiner*—Lewis T. Jacobs
*Attorney*—William M. Yates et al.

[57] ABSTRACT

The present invention relates to bituminous polyepoxide compositions and their use. In particular, the bituminous polyepoxide compositions of this invention may be used for coating substrates such as asphalt, concrete and metals, for example, steel. The bituminous polyepoxide coating compositions of the invention may be advantageously used for surfacing roadways, walkways and aircraft runways for producing self-levelling floors, for coating pipes and lining tanks, for electrical insulation, and as joint compounds.

13 Claims, No Drawings

EPOXY BITUMEN SYSTEM FOR ROAD SURFACING

BACKGROUND OF THE INVENTION

The main problems arising from bituminous coating concern the adhesion of the coating to the substrate and the flexibility of the coating in relation to abrasion resistance. Generally, the more abrasive resistant a coating composition is, the less flexible it is, and it is thence more liable to cracking. The curing time of the composition should be as short as possible and the composition which is made up from resin and hardener must not separate after mixing. Furthermore, application of the coating composition should preferably be an easy operation.

SUMMARY OF THE INVENTION

It has now been found that the use of a urethane modified epoxy resin in a composition based on epoxy resin and bitumen provides excellent adhesion of the composition to most substrates. It has further been found that the curing characteristics of such a composition under severe conditions of cold and/or wet weather are favoured by the use of a hardener consisting of a mixture of an aromatic polyamine and a phenolic compound.

In accordance with the broadest aspect of the invention there is provided a curable epoxide-bitumen composition comprising (a) a urethane modified epoxy resin, (b) a soft bitumen having a pen value of more than 250 and (c) a hardener which is a mixture of an aromatic polyamine and a phenolic compound. The "pen valve" as used in this specification and claims is the penetration value, measured according to ASTM D5 – 65 (equals DIN 1995).

DESCRIPTION OF THE PREFERRED EMBODIMENTS

The urethane modified epoxy resins which may be used in the composition of the present invention include those resins which comprise an epoxy resin of the polyglycidyl ethers of polyhydric phenols and alcohols type, and a modifier comprising the reaction product of from about 5 to about 40 parts per hundred parts of said epoxy resin of an adduct of a polyether polyol and an organic isocyanate, said adduct having from 0 up to about 30 percent by weight of free — NCO groups, with a scavenger compound which is non-reactive with said epoxy resin and which contains at least one —OH or —SH group in sufficient quantity to react with said free —NCO groups. Various examples of such urethane modified epoxy resins are given in U.S. Pat. No. 3,525,779 and it is to be understood that the disclosure of that patent relative to urethane modified epoxy resins is incorporated by reference into this specification.

A prepared urethane modified epoxy resin is the reaction product of an epoxy resin which is the condensation product of epichlorohydrin and a bisphenol, e.g. bisphenol A or bisphenol F, an epoxy resin which is the diglycidyl ether of polyepichlorohydrin, a prepolymer made from a condensation product of glycerol and propylene oxide having a molecular weight of about 2,000 to about 3,000 and toluene diisocyanate, and tetraethylene glycol. A particularly preferred urethane modified epoxy resin is that described in part (a) of Example I which follows.

As regards the soft bitumen to be used in the composition of the present invention, any of the currently commercially available materials may be employed. These materials include cutback bitumen, coal tar, bitumen oils, oil tar, tar oils, and mixtures thereof.

The hardener of the present invention is a mixture of any aromatic diamine or polyamine together with any phenolic compound, preferably a polyphenol. Advantageously, the hardener is a mixture of equal parts by weight of an aromatic polyamine and cresylic acid. "Peracit 8790" (registered Trade Mark) is a particularly suitable aromatic polyamine.

According to the preferred embodiment of this invention, the curable epoxide-bitumen composition so far described additionally contains at least one of the following components:

i. a non-modified epoxy resin;
ii. a reactive flexibilizer, reacting with the hardener, which is an aliphatic triglycidyl ether;
iii. a curing accelerator which is a cycloaliphatic amine;
iv. an organic solvent for lowering the viscosity and improving compatibility; and
v. a reactive compatibilizer which is an epoxidized unsaturated fatty acid ester.

Preferred non-modified epoxy resins include "DER 331" (registered Trade Mark) which is a bisphenol A glycidyl ether and all liquid bisphenol A glycidyl ether resins, whether straight chained or otherwise.

"Flexibilizer 151" (registered Trade Mark) which is a mixture of the di- and triglycidyl ethers of propylene glycol P 1200 having an epoxide equivalent weight of about 675 and a viscosity at 75°F. of 250 centipoise is a preferred reactive flexibilizer. Other reeactive flexibilizers which may be beneficially used are the aliphatic difunctional epoxy resins.

Among the referred curing accelerators are cycloaliphatic amines such as aminoethyl piperazine and "Dowamine G 100T" (registered Trade Mark) which is a blend of aminoethyl piperazine and diethylenetriamine, as well as other amines or amides containing secondary and/or tertiary amine groups.

Advantageously, xylene, toluene or any organic liquid or a mixture thereof having a boiling point greater than 50°C., whether reactive or not, may be used as an organic solvent for lowering the viscosity and improving compatibility in the curable epoxide-bitumen composition.

An example of a preferred reactive compatibilizer is "Estabex 2386" (registered Trade Mark) which is a liquid epoxidized fatty acid monoester having a viscosity of 28 centipoise at 20°C. Other epoxidized liquid fatty acid esters or fatty acids, and tall oil may also be beneficially employed.

The following table sets out the operative and preferred ranges of concentration of the essential and inessential components of the curable epoxide-bitumen compositions of the present invention:

| Component | % of cured composition operative range | preferred range |
|---|---|---|
| a) -Urethane modified epoxy resin | 10–50 | 15–25 |
| b) - Soft bitumen (PEN<250) | 5–50 | 30–40 |
| c) - Hardener | 10–30 | 10–15 |
| i) - Epoxy resin | 0–30 | 10–17 |
| ii) - Reactive flexibilizer | 0–15 | 0–7 |
| iii) - Curing accelerator | 0–15 | 3–10 |
| iv) - Solvent | 0–10 | 3–6 |
| v) - Reactive compatibilizer | 0–20 | 0–12 |

Included within the scope of the present invention is the process by which the novel epoxide bitumen compositions are prepared. In general the composition is made up shortly prior to use by mixing two partial compositions (A and B), one of the partial compositions (A) being the "resin" part, and the other (B) the hardener" part.

In accordance with the invention there is provided a process for preparing a curable epoxide-bitumen composition which process comprises mixing two partial compositions, one of the compositions comprising a urethane modified epoxy resin, the other composition comprising a hardener which is a mixture of an aromatic polyamine and a phenolic compound, wherein at least one of said two partial compositions comprises a soft bitumen having a pen value more than 250, e.g. from 250 to 450. Either one or both of the partial compositions may contain at least one of the additional components hereinbefore described, namely, a non-modified epoxy resin; a reactive flexibilizer; a curing accelerator; an organic solvent; and a reactive compatibilizer. Preferably, the partial compositions are homogeneous liquids of low viscosity and having densities of about 1.1 to 1.2 for the resin part and about 1.0 for the hardener part. It is convenient for the partial compositions to be so made up as to provide the desired epoxide-bitumen composition when mixed in a certain standard ratio, e.g. 1:1 or 4:1, concerning the ratio resin composition: hardener composition. These ratios may be by volume or by weight.

As a general procedure, the resin part of the composition may be formed by mixing the different components without heating. If necessary, in order to facilitate mixing, the mixture may be heated up to about 70°C. When bitumen is used it is preferably heated of 70°C. to 90°C. so that it flows sufficiently. The components should be mixed together with vigorous stirring and when cool the mixture may be transferred to drums for storage.

In forming the hardener part of the composition, an aromatic polyamine is melted and mixed with, say, cresylic acid until a homogeneous solution results. At this stage, a curing accelerator is preferably added slowly with stirring, care being taken to control the exothermic reaction. Other components may then be added, for example, bitumen which has previously been warmed to about 80°C., the temperature of the mixture being preferably held at about 70°C. Once the mixture has been allowed to cool down to about 30°C., an organic solvent may conveniently be added if required. Throughout the preparative procedure, the mixture should be stirred vigorously and finally the mixture may be transferred to drums for storage.

It is preferred that both resin part and hardener part of the composition contain bitumen since the mixing of these two partial compositions is thus rendered more facile.

Further in accordance with the present invention the curable epoxide-bitumen compositions hereinbefore disclosed may be combined with fillers up to a ratio of 1:6 (composition to filler). An aggregate used for this purpose is preferably as hard as possible and calcined bauxite (3 to 8 mm) and basalt are particularly recommended. If an aggregate is used, it can be incorporated into the curable composition before application to a substrate, or it may be spread on the curable composition and compacted therein after application to a substrate and before the composition has set hard.

The invention extends to the application of a novel, curable epoxide-bitumen composition as herein described to a substrate by any conventional technique wherein the substrate is coated with the curable composition. Aggregate may or may not be incorporated in the curable composition.

The following Examples serve to further illustrate the present invention. The parts mentioned therein are by weight if not otherwise stated.

Example I a. Composition A (resin)

65 parts of an urethane modified epoxide resin (see below) are mixed with stirring with 25 parts of a liquid polyepoxide resin, being the condensation product of epichlorohydrin and bisphenol A, having an epoxy equivalent weight of about 185 (resin "DER 331", "DER 331" is a registered Trade Mark). To this mixture, 10 parts of a mixture of the di- and triglycidyl ethers of propylene glycol P 1200 ("Flexibilizer 151") are added with stirring.

b. Composition B (hardener)

To 6 parts of xylene, 25 parts of cresylic acid are added. Upon completion of solution, 25 parts of an aromatic polyamine epoxy hardener ("Peracit 8790") are added with stirring at 30° to 50°C. When complete solution is achieved, 12 parts of epoxidized soybeam oil ("Estabex 2386") are slowly given to the mixture, and the temperature will rise to 60°–70°C. due to an exothermic reaction. To the warm mixture, 10 parts of an accelerator ("Dowamine G 100T", a blend of N,N-aminoethyl piperazine and diethylene triamine) is added under stirring. The mixture still being warm, 22 parts of a bitumen having a penetration value of about 450 and preheated to about 80°C., are added. The mixture is stirred for about 20 minutes and allowed to cool to room temperature, with occasional stirring.

c. Complete composition

The complete composition is made up by mixing equal volumes of compositions A and B.

d. Urethane modified epoxide resin 100 parts of a condensation product of glycerol and propylene oxide, having a molecular weight of about 2700, are reacted in the presence of a conventional catalyst and a defoamer, with 33 parts of toluene diisocyanate, to form a prepolymer.

Under the conditions specified in U.S. Pat. No. 3,525,779, 100 parts of epoxy resin "DER 331" (a condensation product of epichlorohydrin and bisphenol A having an epoxy equivalent weight of about 185), 10 parts of epoxy resin "DER 732" (diglycidyl ether of polypropyleneglycol having an epoxy equivalent weight of 305 to 335 and viscosity of 55 to 100 cps.), 4 parts of tetraethylene glycol, and 20 parts of the prepolymer described above, are reacted to give the desired urethane modified epoxide resins, designated as "XD–3599".

EXAMPLE II

An important realisation of the present invention comprises the presence of soft bitumen in composition A. This Example describes such a composition. For the abbreviations and Trade Marks, see Example I.

Composition A

To a warm mixture of:

| | |
|---|---|
| DER XD - 3599 | 30 parts |
| Estabex 2386 | 15 parts |
| Flexibilizer 151 | 7 parts |
| DER 331 | 23 parts |

25 parts of a pen 450 bitumen, previously heated to about 80°C., are added under stirring.

Composition B

According to the method of Example I, part (b), the following compounds are mixed:

| | |
|---|---|
| Xylene | 6 parts |
| Peracit 8790/cresylic acid 1:1 | 50 parts |
| Estabex 2386 | 12 parts |
| Dowamine G 100T | 8 parts |
| pen 450 bitumen | 24 parts |

Each of the two compositions has a viscosity of about 500° cps at room temperature. When mixed in a volumetric proportion of 1:1 the complete composition has a pot life of about 1 hour at 20°C.

EXAMPLE III

In the manner described in Example II, the following compositions are made up:

Composition A
| | |
|---|---|
| DER XD-3599 | 32 parts |
| Estabex 2386 | 12 parts |
| Flexibilizer 151 | 8 parts |
| DER 331 | 32 parts |
| Bitumen 450 pen | 16 parts |

Composition B
| | |
|---|---|
| Xylene | 7 parts |
| Peracit 8790/cresylic acid 1:1 | 42 parts |
| Estabex 2386 | 12 parts |
| Dowamine G 100T | 12 parts |
| Bitumen 450 pen | 27 parts |

The mixing of compositions A and B is effected with a ratio of 1:1, by volume. Since the respective densities of composition A and B are about 1,13 and 1,0, this equals a mixing ratio by weight of about 53:47.

EXAMPLE IV

In the manner described in Example II, the following compositions are prepared:

Composition A
| | |
|---|---|
| DER XD-3599 | 32 parts |
| Estabex 2386 | 12 parts |
| Flexibilizer 151 | 4 parts |
| DER 331 | 32 parts |
| Bitumen 300 to 450 | 16 parts |

Composition B
| | |
|---|---|
| Xylene | 8 parts |
| Peracit 8790/cresylic acid 1:1 | 44 parts |
| Estabex 2386 | 13 parts |
| N,N-aminoethyl piperazine | 7 parts |
| Bitumen 300 to 450 pen | 28 parts |

Compositions A and B are mixed 1:1 by volume.

EXAMPLE V

This Example shows the use of the compositions described above in the road making industry. Used as a curable binder for an aggregate, it gives a very tough anti-skid surface.

53 parts by weight (50 parts by volume) of composition A of Example III (specific gravity at 25°C: 1,16; viscosity at 25°C: about 400 cps) are mixed with 47 parts by weight (50 parts by volume) of composition B of Example III (specific gravity at 25°C: 1,0; viscosity at 25°C: about 1,200 cps).

The pot life at an initial temperature of 25°C. is about 30 to 40 minutes, at an initial temperature of 50°C. about 15 minutes.

The mixed composition is applied to a normally dry concrete road or to an ordinary asphalt road, in a thickness of about 1 mm, corresponding to about 1,1 to 1,4 kg/m². It can be applied at ambient or elevated temperatures. A two component spray machine can be used, or small quantities of the two compositions are hand mixed just before use.

On the so obtained coating, an aggregate is spread as to completely cover the coating. The particle size of the aggregate may be between 1 and 12 mm, the fractions of 3 to 5 mm or of 5 to 8 mm being the preferred ones. Calcined bauxite is preferred as an aggregate, but commonly used aggregates may replace the bauxite. The mixing of coating composition to aggregate will be at about 1 : (3,5–5). When the system has cured, loose aggregate is removed. Traffic can be allowed 2 to 12 hours after application, depending on curing conditions.

A preheating of the aggregate until about 120°C. will reduce the curing time.

The tensile strength of the cured system was found to be as high as 100 kg/cm² after 7 days. The elongation at break was 65 percent.

EXAMPLE VI a. Composition A (resin part)

215 parts of "XD 3599" are mixed with 165 parts of "DER 331" at room temperature. To the mixture, 180 parts of a tar oil having a viscosity of about 700 cP and 190 parts of melted bitumen (PEN 300), heated to about 80°C., are added under stirring; the final temperature of the mixture is about 40°C. After cooling to about 30°C., 30 parts of xylene are added under stirring.

b. Composition B (hardener part)

130 parts of "PERAN 2830" (a 1:1 mixture of "Peracit 8790" and cresylic acid) are mixed with 90 parts of a reaction mixture of aminoethyl piperazine and nonylphenol ("PERAN 2811").

c. Complete composition

The complete composition is made up by mixing 4 parts of composition A with 1 part of composition B.

In general, the cured resin compositions of the present invention possess excellent flexibility, elongation (between 20 and 100 percent) and tensile strength (50 to 250 kg/cm²) properties.

What is claimed is:

1. A cured epoxide-bitumen composition that is the reaction product of a mixture comprising
   A. from 15 to 25 percent by weight of the cured composition of a urethane modified epoxy resin comprising:
   A curable resin composition comprising essentially:
      a. an epoxy resin of the polyglycidyl ethers of polyhydric phenols and alcohols type, and
      b. a modifier, comprising the reaction product of
         1. from about 5 to 40 parts per hundred parts of said epoxy resin of an adduct of a polyether polyol and an organic isocyanate, said adduct having from 0 up to about 30 percent by weight of free —NCO groups, with
         2. scavenger compound which is non-reactive with said epoxy resin and which contains at least one active group from the class consisting of —OH and —SH in sufficient quantity to react with said free —NCO groups;

B. from 30 to 40 percent by weight of the cured composition of a soft bituminous material having a pen value of more than 250, and C. from 10 to 15 percent by weight of the cured composition of a hardener being about a 1 to 1 mixture by weight of an aromatic polyamine and a phenolic compound.

2. A composition as claimed in claim 1 comprising a non-modified epoxy resin is present in an amount of from 10 to 17 percent by weight of the cured composition.

3. A composition as claimed in claim 2 wherein the non-modified epoxy resin is a bisphenol glycidyl ether.

4. A composition as claimed in claim 1 comprising an aliphatic triglycidyl ether in an amount of up to 7 percent by weight of the cured composition.

5. A composition as claimed in claim 1 further comprising a cycloaliphatic amine in an amount of from 3 to 10 percent by weight of the cured composition as a curing accelerator.

6. A composition as claimed in claim 5 wherein the cycloaliphatic amine is N,N'-aminoethylpiperazine.

7. A composition as claimed in claim 1 comprising from 3 to 6 percent by weight of the cured composition of an organic solvent as a viscosity lowering agent.

8. A composition as claimed in claim 7 wherein the organic solvent is toluene, xylene or a mixture thereof.

9. A composition as claimed in claim 1 comprising an epoxidized unsaturated fatty acid mono ester in an amount of up to 12 percent by weight of the cured composition.

10. A composition as claimed in claim 1 wherein the urethane modified epoxy resin is the reaction product of A. 100 parts of an epoxy resin being the condensation product of epichlorohydrin and a bisphenol, B. 10 parts of an epoxy resin being the diglycidyl ether of a polypropylene glycol, C. 20 parts of a prepolymer made from a condensation product of glycerol and propylene oxide having a molecular weight of about 2,000 to about 3,000 and toluene diisocyanate, and D. 4 parts of tetraethylene glycol.

11. A process for preparing a curable epoxide-bitumen composition comprising the composition of claim 1 which comprises mixing two partial compositions, one of the compositions comprising a urethane modified epoxy resin, the other composition comprising a hardener which is a mixture of an aromatic polyamine and a phenolic compound, wherein at least one of said two partial compositions comprises a soft bitumen having a pen value of at least 250.

12. A process as claimed in claim 11 wherein at least one of the partial compositions comprises at least one additional component which is a non-modified epoxy resin in an amount up to 17 parts, a reactive flexibilizer in an amount up to 30 parts, a curing accelerator in an amount up to 15 parts, an organic solvent in an amount up to 10 parts or a reactive compatibilizer in an amount up to 20 parts.

13. A process as claimed in claim 11 wherein the partial composition comprising a urethane-modified epoxy resin has a density of 1.1 to 1.2, the partial composition comprising a hardener has a density of 1.0 and partial compositions are mixed in a 1:1 volumetric ratio.

* * * * *

PO-1050
(5/69)

UNITED STATES PATENT OFFICE
CERTIFICATE OF CORRECTION

Patent No. 3,755,226          Dated Aug. 28, 1973

Inventor(s) Paal Christiansen and Johan Spoelder

It is certified that error appears in the above-identified patent and that said Letters Patent are hereby corrected as shown below:

In col. 2, line 63, delete "<" and insert therefor -- > --.

In col. 4, line 29, delete "soybeam" and insert therefor --soybean--.

Signed and sealed this 5th day of November 1974.

(SEAL)
Attest:

McCOY M. GIBSON JR.
Attesting Officer

C. MARSHALL DANN
Commissioner of Patents